United States Patent
Isomichi et al.

(10) Patent No.: US 6,208,838 B1
(45) Date of Patent: Mar. 27, 2001

(54) PAGER WITH RECEPTION ERROR NOTIFICATION

(75) Inventors: Yasuhiro Isomichi; Shigeru Uchiyama, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/093,511

(22) Filed: Jun. 8, 1998

(30) Foreign Application Priority Data

Jun. 27, 1997 (JP) .................................................. 9-172037

(51) Int. Cl.$^7$ ...................................................... H04Q 7/06

(52) U.S. Cl. .................. 455/31.1; 455/38.3; 340/825.44; 340/825.22

(58) Field of Search ................................. 455/343, 31.1, 455/38.3; 340/825.44, 825.22

(56) References Cited

U.S. PATENT DOCUMENTS

| | | | |
|---|---|---|---|
| 5,638,450 | * | 6/1997 | Robson .................................. 380/49 |
| 5,726,639 | * | 3/1998 | Romero et al. .................. 340/825.22 |
| 5,831,544 | * | 11/1998 | Park .................................. 340/825.44 |
| 5,847,657 | * | 12/1998 | Tsuchiyama .................... 340/825.44 |
| 5,924,017 | * | 7/1999 | Pinter et al. ......................... 455/38.3 |
| 5,977,881 | * | 11/1999 | Kido ................................. 340/825.44 |
| 6,112,096 | * | 8/2000 | Hasegawa ............................. 455/458 |

\* cited by examiner

*Primary Examiner*—Daniel S. Hunter
*Assistant Examiner*—Alan T. Gantt
(74) *Attorney, Agent, or Firm*—Pearne & Gordon LLP

(57) ABSTRACT

The preset reception time and reception message type are stored in a storage section 7. A reception monitor section 8 checks whether or not a message arrives at the reception time. If lost paging or a reception mistake occurs and the message does not arrive, a notification section 4 or a display section 5 is used to inform the user of the fact. The user can take steps of making a request for resending the message, etc.

4 Claims, 5 Drawing Sheets

| MANAGEMENT NO. | TIME | CONTENTS |
|---|---|---|
| 1 | 8:00 | WEATHER FORECAST |
| 2 | 9:00 | NEWS |
| 3 | 12:00 | STOCK INFORMATION |
| 4 | 18:00 | SPORT |

FIG. 3A

| *888 | *41 | 1 | *42 | 0900 |
|------|-----|---|-----|------|
| 11 | 12 | 13 | 14 | 15 |

FIG. 3B

| MEANING | DATA EXAMPLE |
|---------|--------------|
| SETTING CHANGE MESSAGE HEADER | *888 |
| MANAGEMENT NO. (*41) | 1 ~ 9 |
| RECEPTION TIME (*42) | 24-HOUR SYSTEM, EX. 0330 (AM3:30) |
| RECEPTION CONTENTS (*43) | 1: WEATHER FORECAST<br>2: NEWS<br>3: SPORT<br>4: STOCK INFORMATION |
| TO COMMUNICATION WITH (*44) | SERVICE COMPANY COMMUNICATION NUMBER |

| MANAGEMENT NO. | TIME | CONTENTS | TRANSMITTER INFORMATION |
|---|---|---|---|
| 1 | 8:00 | WEATHER FORECAST | 03-○○○-□□□ |
| 2 | 9:00 | NEWS | 03-△△△-□□□ |
| 3 | 12:00 | STOCK INFORMATION | 03-□□□-×××  |
| 4 | 18:00 | SPORT | 03-×××-△△△ |

PAGER WITH RECEPTION ERROR NOTIFICATION

BACKGROUND OF THE INVENTION

This invention relates to a pager that can inform the user of the fact that information whose reception time is known cannot be received.

Pager use methods are diversified and serve for a business company to distribute various pieces of information to users in addition to serving for one person to page another.

A pager receives a radio signal, takes out a message from the signal, and informs the user of the message. Therefore, the pager cannot receive the signal precisely and causes a reception error at a place where radio wave condition is poor. At the time, the paging operation is not performed, receive data is not displayed, or the part that cannot be received normally is blinked, etc., for display. Some pagers are provided with a function of displaying an error message and the communication number with the transmitter (center) to obtain the correct message, as described in the Unexamined Japanese Patent Application Publication No. Hei 6-204937.

FIG. 8 shows the configuration of a conventional pager. In the figure, numeral 1 is an antenna for receiving a radio signal. A received signal is sent to a radio section 2, which then decodes the signal into a message and sends the message to a control section 3. If the received message is addressed to the home, the control section 3 sounds a bell, for example, in a notification section 4 to inform the user of paging and displays a message on a display section 5.

If reception ends in failure, the control section 3 does not perform the message reception operation or blink-displays erroneously received data, displays the communication number with the center, etc., on the display section 5.

However, for example, if the user is under the ground and the pager can receive no signals, the user cannot even know reception and neither a reception error nor the communication number with the center appears. For example, if the message to be received is pay information service, it is a problem that display is not produced if paging is lost. The user, who pays for information, wants to receive messages reliably.

SUMMARY OF THE INVENTION

It is therefore an object of the invention to provide an excellent pager which checks whether or not the pager receives a message whose reception time is known at the reception time, if the pager does not receive the message at the reception time, informs the user of the fact, and can also previously manage transmitter information for using a DTMF (dual tone multifrequency) signal to easily send a request for resending the message that cannot be received.

To the end, according to the invention of aspect 1, there is provided a pager comprising storage means for storing the reception time and the reception message type, characterized by reception monitor means for checking whether or not a message whose reception time is previously known arrives at the pager at the reception time and notification means for informing the user of the pager of lost paging if the message does not arrive. When the pager cannot receive any message whose reception time is previously known, it can inform the user of the fact.

In the invention of aspect 2, the pager of aspect 1 further includes setting change means using a message received at the pager for arbitrarily changing setting of the reception time and message type stored in the storage means. When the transmitting party wants to change the message transmission time, it can transmit change time data for changing setting of the reception time of the receiving party.

In the invention of aspect 3, the pager of aspect 1 further includes means for sending a DTMF signal and resending control means for controlling the DTMF signal sending means so as to send a message resending request signal if the pager cannot receive a message normally. In addition to the function of aspect 1, when message reception ends in failure, the pager enables the user to use a DTMF signal to easily make a request for resending the message.

In the invention of aspect 4, the pager of aspect 2 further includes means for sending a DTMF signal and resending control means for controlling the DTMF signal sending means so as to send a message resending request signal if the pager cannot receive a message normally. In addition to the function of aspect 2, when message reception ends in failure, the pager enables the user to use a DTMF signal to easily make a request for resending the message. When the transmitting party wants to change the message transmission time, it can transmit change time data for changing setting of the reception time in the receiving party.

BRIEF DESCRIPTION OF THE DRAWINGS

In the accompanying drawings:

FIG. 3A is an illustration to show a setting change message example;

FIG. 3B is an illustration to show a setting change message format example in the first embodiment of the invention;

DETAILED DESCRIPTION OF THE PREFERRED EMBODIMENTS

Referring now to the accompanying drawings, there are shown preferred embodiments of the invention.

(First embodiment)

Figures 1, 2:
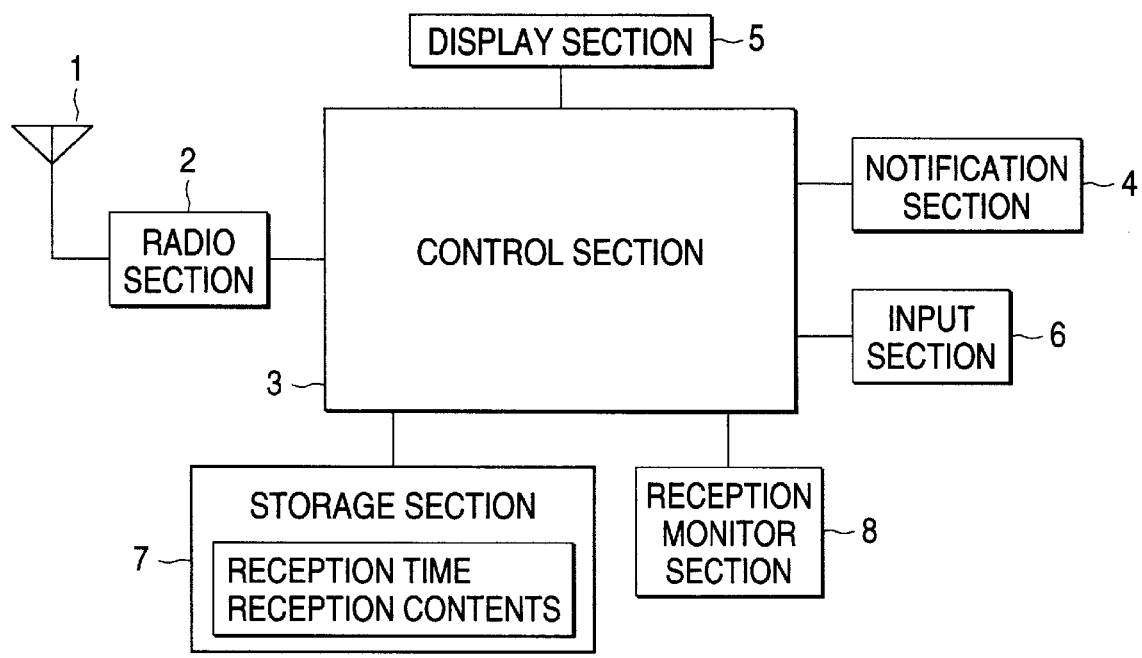
FIG. 1 is a block diagram to show the configuration of a pager in a first embodiment of the invention.
FIG. 2 is an illustration to show a table example of data stored in a storage section 7 in the first embodiment of the invention.

FIG. 1 shows the configuration of a pager in a first embodiment of the invention. In the figure, numeral 1 is an antenna for receiving a radio signal. Numeral 2 is a radio section for decoding the received signal into a message and sending the message to a control section 3. The control section 3 consists of an MPU (micro processing unit) and a control program. When a message is received, the control section 3 controls a notification section 4 and a display section 5, for example, to produce a melody sound, blink an LED (light emitting diode), and display the received message. The notification section 4 is made up of an LED, a buzzer, etc., for example. The display section 5 is made of an LCD (liquid crystal display), for example. Numeral 6 is an input section made up of pushswitches, for example, for performing message read, etc. Numeral 7 is a storage section for storing the reception time of a regularly distributed message, the message type, and communication number data with the transmitter. Flash ROM (read-only memory), EEPROM (electrically erasable and programmable read-only memory), or RAM (random access memory) can be used as the storage section 7. Numeral 8 is a reception monitor section for checking whether or not a message of the setup type can be received normally at the setup time. The reception monitor section 8 is made of a control program in the MPU.

FIG. 2 shows a table example of data stored in the storage section 7. For example, management No. 1 indicates reception of weather forecast information at 8:00.

FIG. 3A shows a time setting change message example. In the figure, numeral 11 is a header indicating a setting change message, numeral 12 is a header indicating a management No., and numeral 13 indicates a management No. Numeral 14 is a reception time header and numeral 15 represents the reception time in a 24-hour system. In the example, management table 1 is set for reception of data at 9:00. If an entry is not changed, it need not be contained in the message for transmission. FIG. 3B shows a format example.

Figure 4:
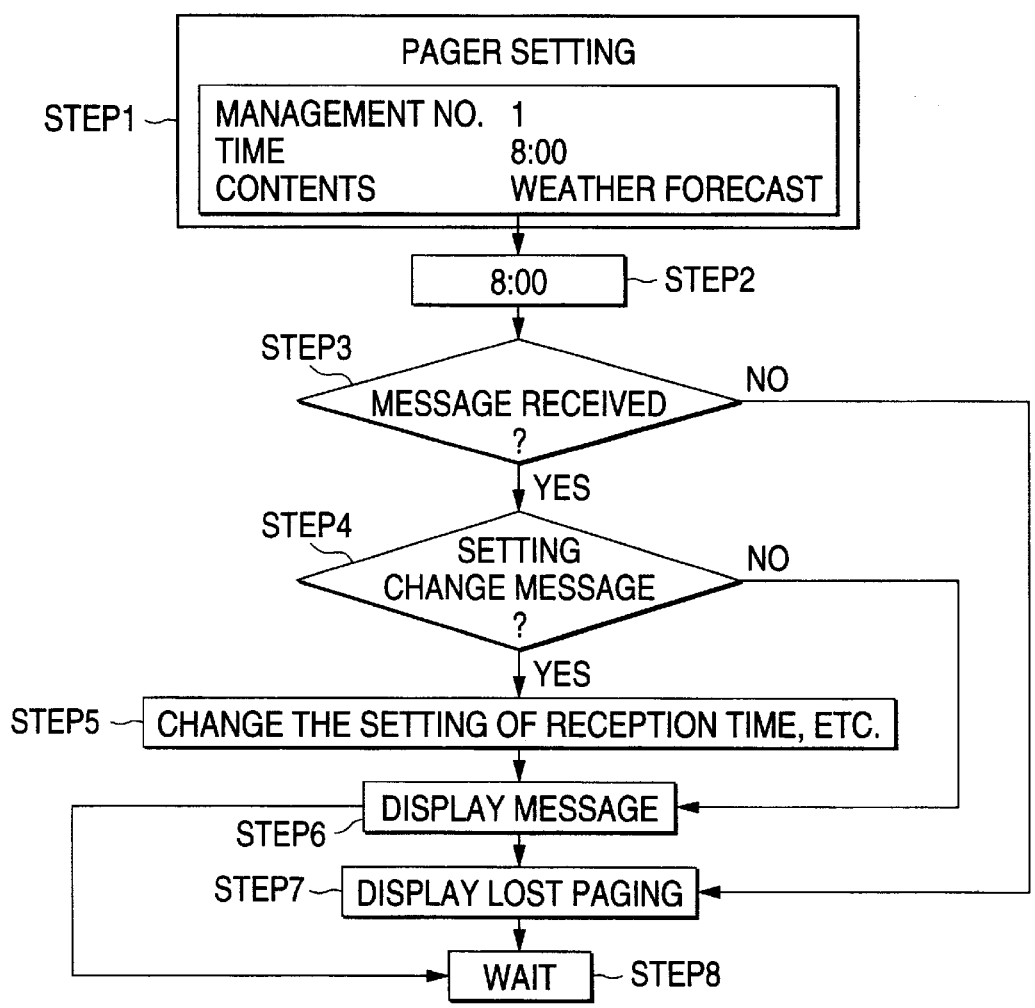
FIG. 4 is a flowchart to show an operation flow in the first embodiment of the invention.

Next, the operation of the first embodiment will be discussed with reference to an operation flowchart of FIG. 4. First, data indicating reception of weather forecast information at 8:00 is previously entered in the storage section 7 in FIG. 1 at step 1. When a clock in the pager reaches 8:00 at step 2, the reception monitor section 8 (see FIG. 1) checks whether or not information is received at step 3. If information can be received, whether the information is weather forecast data or a setting change message is determined in step 4. If the information is weather forecast data, the LED is blinked, the buzzer is beeped, etc., in the notification section 4 to inform the pager user that weather forecast data is received, and a message is displayed on the display section 5 at step 6. Then, the pager returns to a wait state at step 8.

If the received information is a setting change message, setting of the reception time, etc., is changed according to the data contained in the message. For example, the message in FIG. 3A is received and the weather forecast reception time is changed from 8:00 to 9:00 at step 5. Here, a message "Reception time is changed" may be displayed at step 6.

When a reception mistake occurs or the user carrying the pager exists at a place where radio wave does not reach and weather forecast data or a setting change message cannot be received normally at the predetermined time, the LED is blinked or the buzzer is beeped, etc., in the notification section 4 to inform the user that paging is lost, and a message meaning, for example, "message reception ends in failure" is displayed on the display section 5 at step 7. Resultantly, the user recognizes that paging is lost.

When a message is received normally at step 6, if the message is stored, no paging operation may be executed. The paging sound produced when message reception is normal and that when message reception ends in failure may be made different. The LED pattern turned on when message reception is normal and that when message reception ends in failure may be made different. The setting change message with an unchanged entry may be transmitted.

According to the first embodiment described above, if a reception mistake, such as lost paging about a message whose reception time is known occurs, the user is informed of the fact that paging is lost. Thus, the user can take steps of issuing a message resending request to the service company, etc. When the transmitting party wants to change the message transmission time, change time data can be transmitted for easily changing the reception time setting at the receiving party.

(Second embodiment)

Figures 5, 6:
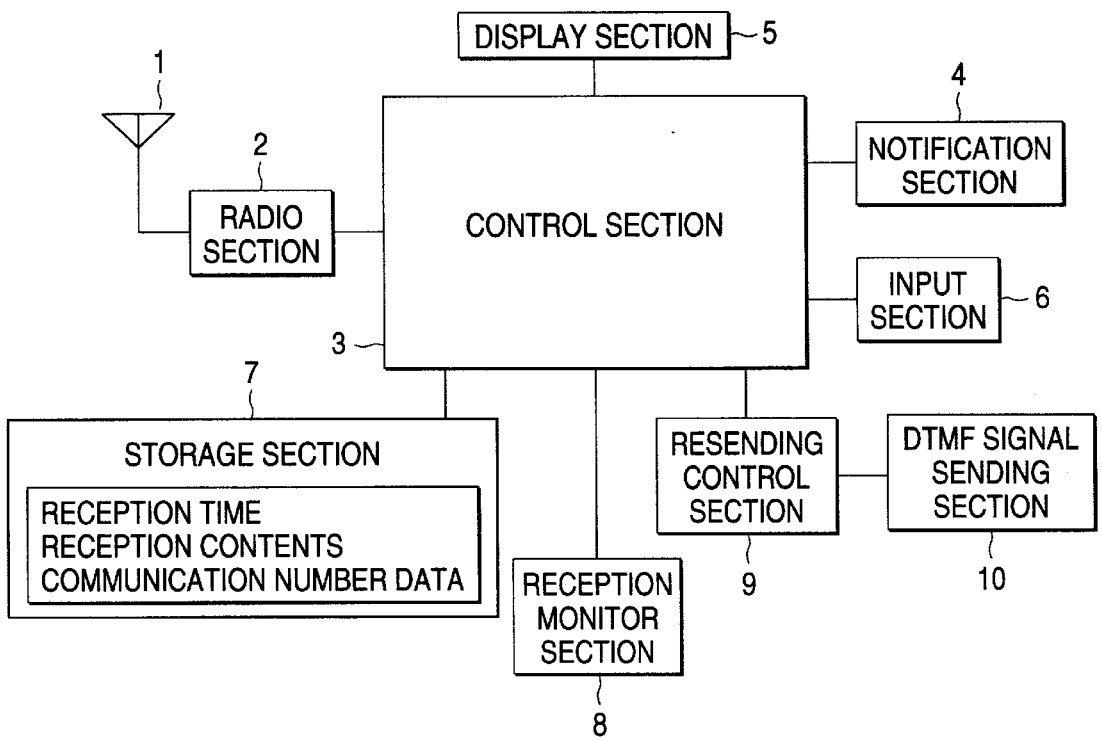
FIG. 5 is a block diagram to show the configuration of a pager in a second embodiment of the invention.
FIG. 6 is an illustration to show a table example of data stored in a storage section 7 in the second embodiment of the invention.

FIG. 5 shows the configuration of a pager in a second embodiment of the invention. Members identical with those previously described with reference to FIG. 1 are denoted by the same reference numerals in FIG. 5. Numeral 9 is a resending control section. If a reception mistake such as lost paging occurs, the resending control section 9 reads related transmitter communication number data from a storage section 7 and generates a signal sent through a DTMF signal sending section 10. The resending control section 9 can be made of a control program as a part of a control section 3. For example, a loudspeaker is used as the DTMF signal sending section 10.

FIG. 6 shows a table example of data stored in the storage section 7. For example, management No. 1 indicates reception of weather forecast information at 8:00. When a message cannot be received normally at 8:00, if the transmitter at 03-○○○-□□□ under the transmitter information is called, the message is resent.

Figure 7:
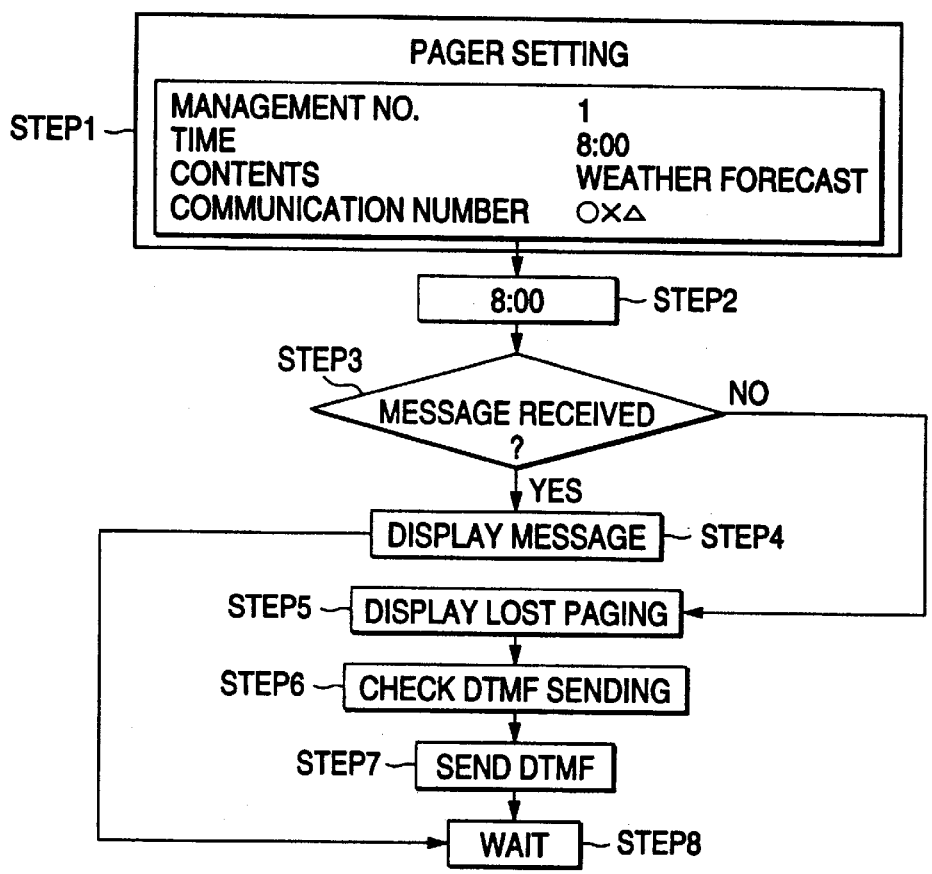
FIG. 7 is a flowchart to show an operation flow in the second embodiment of the invention.
Figure 8:
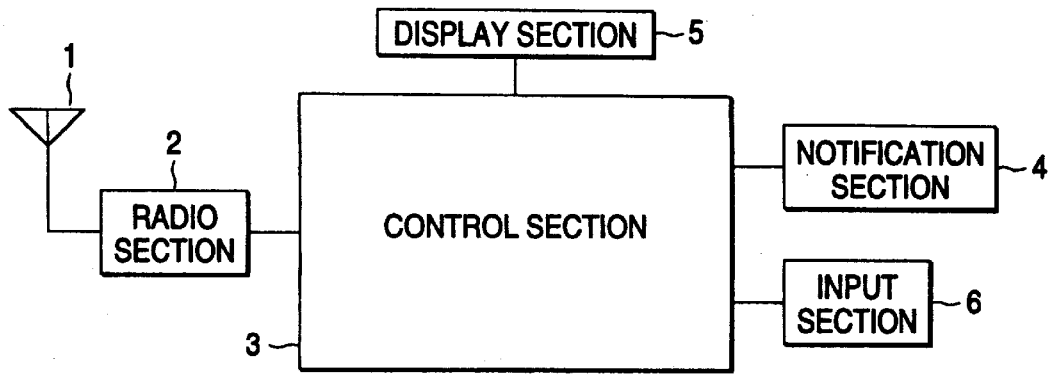
FIG. 8 is a block diagram to show the configuration of a conventional pager.

Next, the operation of the second embodiment will be discussed with reference to an operation flowchart of FIG. 7. First, data indicating reception of weather forecast information at 8:00 is previously entered in the storage section 7 in FIG. 5 at step 1. When a clock in the pager reaches 8:00 at step 2, a reception monitor section 8 checks whether or not weather forecast information is received at step 3. If weather forecast information can be received normally, an LED is blinked, a buzzer is beeped, etc., in a notification section 4 to inform the pager user that weather forecast information is received, and a message is displayed on a display section 5 at step 4. Then, the pager returns to a wait state at step 8.

However, when a reception mistake occurs or the user carrying the pager exists at a place where radio wave does not reach and weather forecast information cannot be received normally at the predetermined time, the LED is blinked, the buzzer is beeped, etc., in the notification section 4 to inform the user that paging is lost, and a message meaning, for example, "weather forecast information reception ends in failure" is displayed on the display section 5 at step 5. Resultantly, the user recognizes that paging occurred.

Then, for example, if the user presses a switch of an input section 6, a message of "Message resending request is made. Are you ready?" is displayed at step 6. If the user puts a DTMF output port of the pager on a mouthpiece of a telephone and again presses the switch of an input section 6, the resending control section 9 converts the communication number data read from the transmitter information in the storage section 7 into a DTMF signal and outputs the signal through the DTMF signal sending section 10 at step 7.

When a message is received normally at step 4, if the message is stored, no paging operation may be executed. The paging sound produced when message reception is normal and that when message reception ends in failure may be made different. The LED pattern turned on when message reception is normal and that when message reception ends in failure may be made different. The party to which a message resending request is to be sent may be displayed on the display section 5.

According to the second embodiment described above, if a reception mistake, such as lost paging for a message whose reception time is known occurs, the user is informed of the fact that paging is lost, and can get in touch with the service company, etc., with a DTMF signal, so that he or she can easily make a message resending request.

As described above, the pager of the invention comprises the reception monitor means for checking whether or not a message whose reception time is previously known arrives at the pager at the reception time and the notification means for informing the user of the pager of lost paging if the message does not arrive, whereby the user, who knows that the pager cannot receive a message, can take steps of issuing a message resending request to the service company, etc. The pager further includes the setting change means using a message received at the pager for arbitrarily changing setting of the reception time and message type stored in the storage means, thereby considerably saving time and labor for the service company to execute a transmission time change procedure and inform the user that the transmission time is changed. The pager further includes the DTMF signal sending means and the resending control means for controlling the DTMF signal sending means so as to send a message resending request signal if the pager cannot receive a message normally, whereby the user can get in touch with the service company, etc., with a DTMF signal, so that he or she can easily make a message resending request.

What is claimed is:

1. A pager comprising:

storage means for storing a predetermined reception time and a predetermined reception message type;

reception monitor means for checking whether or not a message whose reception time is previously known arrives at said pager at the predetermined reception time; and notification means for informing a user of said pager of lost paging if the message does not arrive.

2. The pager as claimed in claim 1, further comprising:

setting change means using a message received at said pager for arbitrarily changing setting of the reception time and message type stored in said storage means.

3. The pager as claimed in claim 1, further comprising:

means for sending a DTMF signal; and resending control means for controlling said DTMF signal sending means so as to send a message resending request signal, if said pager cannot receive a message normally.

4. The pager as claimed in claim 2, further comprising:

means for sending a DTMF signal; and resending control means for controlling said DTMF signal sending means so as to send a message resending request signal, if said pager cannot receive a message normally.

\* \* \* \* \*